United States Patent
Toma et al.

(10) Patent No.: US 11,411,210 B2
(45) Date of Patent: Aug. 9, 2022

(54) POSITIVE ELECTRODE ACTIVE MATERIAL FOR NON-AQUEOUS ELECTROLYTE SECONDARY BATTERY, PROCESS FOR MANUFACTURING POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY USING THE POSITIVE ELECTRODE ACTIVE MATERIAL

(71) Applicant: SUMITOMO METAL MINING CO., LTD., Tokyo (JP)

(72) Inventors: Takahiro Toma, Ehime (JP); Atsushi Fukui, Ehime (JP); Taira Aida, Ehime (JP); Tetsufumi Komukai, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 127 days.

(21) Appl. No.: 16/628,956

(22) PCT Filed: Jun. 27, 2018

(86) PCT No.: PCT/JP2018/024417
§ 371 (c)(1),
(2) Date: Jan. 6, 2020

(87) PCT Pub. No.: WO2019/009160
PCT Pub. Date: Jan. 10, 2019

(65) Prior Publication Data
US 2020/0227732 A1   Jul. 16, 2020

(30) Foreign Application Priority Data
Jul. 5, 2017  (JP) .............................. JP2017-132055

(51) Int. Cl.
*H01M 4/36* (2006.01)
*H01B 1/08* (2006.01)
(Continued)

(52) U.S. Cl.
CPC ............ *H01M 4/364* (2013.01); *C01G 53/50* (2013.01); *C01G 53/66* (2013.01); *H01B 1/08* (2013.01);
(Continued)

(58) Field of Classification Search
CPC ........ H01B 1/08; H01M 4/362; H01M 4/485; H01M 4/505; H01M 4/525; C01G 51/50; C01G 53/50
See application file for complete search history.

(56) References Cited

U.S. PATENT DOCUMENTS 10,637,042 B2 * 4/2020 Lee ........................ H01M 4/131
2010/0310940 A1 * 12/2010 Kim .................. C04B 35/62892
429/231.95
(Continued)

FOREIGN PATENT DOCUMENTS

JP    2011-116580 A    6/2011
JP    2012-074297 A    4/2012
(Continued)

OTHER PUBLICATIONS

Hildebrand et al "Al2O3, SiO2 and TiO2 as Coatings for Safer LiNi0.8Co0.15Al0.05O2 . . . ", Journal of The Electrochemical Society, 164 (9) A2190-A2198 (2017).*
(Continued)

Primary Examiner — Mark Kopec
(74) Attorney, Agent, or Firm — Oliff PLC (57) ABSTRACT

A positive electrode active material for a non-aqueous electrolyte secondary battery includes a lithium metal composite oxide, wherein the lithium metal composite oxide is
(Continued)

represented by a general formula: $Li_aNi_{1-x-y-z}Co_xD_yE_zO_2$ (wherein, in the formula, $0.05 \leq x \leq 0.35$, $0 \leq y \leq 0.35$, $0.002 \leq z \leq 0.05$, $1.00 \leq a \leq 1.30$, an element D is at least one type of element selected from Mn, V, Mo, Nb, Ti, and W, and an element E is an element forming an alloy with lithium at a potential more noble than a potential in which ions of the element E are reduced), wherein the lithium metal composite oxide includes primary and secondary particles formed by aggregating the primary particles, wherein an oxide containing the element E exists at a surface of at least either of the primary and secondary particles.

6 Claims, 2 Drawing Sheets

(51) Int. Cl.
| | |
|---|---|
| *C01G 51/00* | (2006.01) |
| *C01G 53/00* | (2006.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ........... *H01M 4/505* (2013.01); *H01M 4/525* (2013.01); *H01M 10/0525* (2013.01); *C01P 2002/52* (2013.01); *C01P 2006/40* (2013.01); *H01M 2004/028* (2013.01)

(56) References Cited

U.S. PATENT DOCUMENTS

| | | | |
|---|---|---|---|
| 2014/0087262 A1* | 3/2014 | Imahashi | C01G 53/50 429/223 |
| 2016/0013475 A1* | 1/2016 | Ofer | C01D 15/02 252/182.1 |
| 2016/0351898 A1* | 12/2016 | Fang | H01M 4/5825 |
| 2017/0033354 A1* | 2/2017 | Ruan | H01M 4/505 |
| 2020/0274160 A1* | 8/2020 | Ren | H01M 4/525 |

FOREIGN PATENT DOCUMENTS

| | | |
|---|---|---|
| JP | 2012-221855 A | 11/2012 |
| JP | 2012-230898 A | 11/2012 |
| JP | 2014-528891 A | 10/2014 |
| JP | 2016-031881 A | 3/2016 |
| JP | 2017-139168 A | 8/2017 |
| JP | 2018-106892 A | 7/2018 |

OTHER PUBLICATIONS

Sep. 18, 2018 International Search Report issued in International Patent Application No. PCT/JP2018/024417.

* cited by examiner

POSITIVE ELECTRODE ACTIVE MATERIAL FOR NON-AQUEOUS ELECTROLYTE SECONDARY BATTERY, PROCESS FOR MANUFACTURING POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY USING THE POSITIVE ELECTRODE ACTIVE MATERIAL

BACKGROUND OF THE INVENTION

Field of the Invention

The present invention relates to a positive electrode active material for a non-aqueous electrolyte secondary battery, a process for manufacturing a positive electrode active material for a non-aqueous electrolyte secondary battery, and a non-aqueous electrolyte secondary battery using the positive electrode active material. This application is based upon and claims the benefit of priority from prior Japanese Patent Application No. 2017-132055 filed on Jul. 5, 2017 in Japan, which is incorporated by reference herein.

Description of Related Art

In recent years, there has been a strong demand for the development of compact and lightweight non-aqueous electrolyte secondary batteries having a high energy density due to the widespread use of portable electronic devices such as mobile phones and notebook computers. In addition, there has been a strong demand for the development of secondary batteries excellent in output characteristic as batteries for electric vehicles including hybrid electric vehicles.

As secondary batteries satisfying such demands, there is a lithium ion secondary battery. This lithium ion secondary battery is composed of a negative electrode, a positive electrode, an electrolyte solution and else, and as an active material of the negative electrode and the positive electrode, a material capable of insertion and deinsertion of lithium is used.

At present, research and development of lithium ion secondary batteries has been carried out actively, and among others, a lithium ion secondary battery using layered or spinel type lithium metal composite oxide as a positive electrode material can obtain high voltage as 4V grade, so it is being in practical use as a battery having high energy density.

As materials mainly proposed by now, a lithium cobalt composite oxide ($LiCoO_2$) which is relatively easy to synthesize, a lithium nickel composite oxide ($LiNiO_2$) using nickel which is cheaper than cobalt, a lithium nickel cobalt manganese composite oxide ($LiNi_{1/3}Co_{1/3}Mn_{1/3}O_2$), a lithium manganese composite oxide ($LiMn_2O_4$) using manganese, and else can be cited.

In order to obtain a lithium ion secondary battery excellent in output characteristic, it is necessary that the positive electrode active material is composed by particles with narrow particle size distribution and small particle size. This is because the particles with small particle size is having large specific surface area, and when it is used as the positive electrode active material, not only that it secures reacting area with an electrolyte solution sufficiently, but also the positive electrode is configured thin and it shortens moving distance of lithium ions between the positive electrode and the negative electrode, so positive electrode resistance is decreased.

On the other hand, in order to further improve output characteristic, not only a decrease of positive electrode resistance of the positive electrode active material, but also a decrease of negative electrode resistance of the negative electrode active material is required.

For example, in Patent Literature 1, a multilayer structural carbon material for a non-aqueous secondary battery is formed by coating a surface of a graphite particle with amorphous carbon, and satisfies the following conditions: (1) an average particle size d50 of the multilayer structural carbon material is 1 μm or more and 18 μm or less; (2) a weight ratio of graphite particle/amorphous carbon is 96/4 or more and 99.99/0.01 or less; (3) a tap density of the multilayer structural carbon material is 0.85 g/cm or more and 1.3 g/cm or less, is proposed.

According to this proposal, a non-aqueous electrolyte secondary battery, using an obtained carbon material for the negative electrode of the non-aqueous electrolyte secondary battery as an electrode, decreases negative electrode resistance effectively, and also, it indicates a characteristic that a decrease of storage characteristic (negative electrode double layer capacity) is lessen.

SUMMARY OF THE INVENTION

By the way, in order to further decrease negative electrode resistance, it is effective to enlarge reacting area with an electrolyte solution. In order to enlarge reacting area with the electrolyte solution, it is effective to set a composition ratio of the negative electrode in cell configuration of the secondary battery at a high ratio.

However, when the composition ratio of the negative electrode is set at a high ratio, relatively a composition ratio of the positive electrode decreases, and causes a decrease in charge capacity of the secondary battery. In other words, there is a problem that, in order to decrease negative electrode resistance, a proportion of a surface area of the positive electrode decreases to increase positive electrode resistance, and results in increase of battery resistance. Therefore, a material of the secondary battery is required to inhibit negative electrode resistance without changing the composition ratio of the positive electrode and the negative electrode.

Considering the above problems, the purpose of the present invention is to provide a new and improved positive electrode active material for a non-aqueous electrolyte secondary battery, a process for manufacturing a positive electrode active material for a non-aqueous electrolyte secondary battery, and a non-aqueous electrolyte secondary battery using the positive electrode active material, wherein, when composing the non-aqueous electrolyte secondary battery, the positive electrode active material is capable of improving output characteristic of the battery by decreasing negative electrode resistance, without changing a composition ratio of a positive electrode and a negative electrode.

In order to solve the above problem, as a result of keen examination about influence on negative electrode resistance of the battery, by powder characteristic or composition of a lithium metal composite oxide used as the positive electrode active material for the non-aqueous electrolyte secondary battery, the inventors have found that, by adding an element which elutes in an electrolyte solution when charging and discharging, and forms an alloy with lithium at a surface of a negative electrode active material, to the lithium metal composite oxide, electrochemical reaction field of lithium at a surface of the negative electrode increases, and decreases negative electrode resistance to improve output characteristic of the battery.

In other words, one embodiment of the present invention is a positive electrode active material for a non-aqueous electrolyte secondary battery comprising a lithium metal composite oxide, wherein the lithium metal composite oxide is represented by a general formula: $Li_aNi_{1-x-y-z}Co_xD_yE_zO_2$ (wherein, in the formula, $0.05 \le x \le 0.35$, $0 \le y \le 0.35$, $0.002 \le z \le 0.05$, $1.00 \le a \le 1.30$, an element D is at least one type of element selected from Mn, V, Mo, Nb, Ti, and W, and an element E is an element forming an alloy with lithium at a potential more noble than a potential in which ions of the element E are reduced), wherein the lithium metal composite oxide comprises primary particles and secondary particles formed by aggregating the primary particles, wherein an oxide containing the element E exists at a surface of at least either of the primary particles and the secondary particles.

In addition, in one embodiment of the present invention, it is preferable that the element E is at least one type of element selected from Mg, Al, and Si.

In addition, in one embodiment of the present invention, it is preferable that a part of the element E is solid-solved in the primary particles or the secondary particles.

Another embodiment of the present invention is a process for manufacturing a positive electrode active material for a non-aqueous electrolyte secondary battery comprising a lithium metal composite oxide, wherein the lithium metal composite oxide is represented by a general formula: $Li_aNi_{1-x-y-z}Co_xD_yE_zO_2$ (wherein, in the formula, $0.05 \le x \le 0.35$, $0 \le y \le 0.35$, $0.002 \le z \le 0.05$, $1.00 \le a \le 1.30$, an element D is at least one type of element selected from Mn, V, Mo, Nb, Ti, and W, and an element E is an element forming an alloy with lithium at a potential more noble than a potential in which ions of the element E are reduced), wherein the lithium metal composite oxide comprises primary particles and secondary particles formed by aggregating the primary particles, wherein the process comprising: a crystallization step for crystallizing transition metal composite hydroxide particles by supplying and mixing an aqueous solution at least containing nickel and cobalt, an aqueous solution containing ammonium ion donor, and an alkaline solution, in a reaction tank; a mixing step for mixing a transition metal composite hydroxide obtained by the crystallization step, a compound containing the element E, and a lithium compound; a firing step for firing a lithium mixture obtained by the mixing step at a temperature of 700° C. to 1000° C. and forming a lithium metal composite oxide, wherein an oxide containing the element E is formed at a surface of at least either of the primary particles and the secondary particles by the mixing step.

In addition, in other embodiment of the present invention, it is preferable that the element E is at least one type of element selected from Mg, Al, and Si.

Further, other embodiment of the present invention is a non-aqueous electrolyte secondary battery comprising: a positive electrode; a negative electrode; a separator; and a non-aqueous electrolyte, wherein the positive electrode includes the positive electrode active material for the non-aqueous electrolyte secondary battery as constituent material.

In addition, in other embodiment of the present invention, it is preferable that an alloy of the element E and lithium exists at a surface of the negative electrode after charging and discharging.

In addition, in other embodiment of the present invention, it is preferable that the element E contained in the negative electrode after charging and discharging is 50 mass ppm or more and 600 mass ppm or less with respect to the negative electrode.

According to the present invention, a battery excellent in output characteristic is obtained by decreasing negative electrode resistance without changing a composition ratio of a positive electrode and a negative electrode, by using a positive electrode active material for a non-aqueous electrolyte secondary battery as a positive electrode material.

DETAILED DESCRIPTION OF THE INVENTION

Hereinafter, explaining about a positive electrode active material for a non-aqueous electrolyte secondary battery and its manufacturing process, and then explaining about a non-aqueous electrolyte secondary battery using the positive electrode active material for the non-aqueous electrolyte secondary battery. In addition, the present embodiments explained in the below are not intended to unjustly limit the content of the present invention described in claims, and not all of the features explained in the present embodiments are always necessary as means for solving the problem of the present invention.

[1. Positive Electrode Active Material]

A positive electrode active material for a non-aqueous electrolyte secondary battery relating to one embodiment of the present invention comprises a lithium metal composite oxide, which is represented by a general formula: $Li_aNi_{1-x-y-z}Co_xD_yE_zO_2$ (wherein, in the formula, $0.05 \le x \le 0.35$, $0 \le y \le 0.35$, $0.002 \le z \le 0.05$, $1.00 \le a \le 1.30$, an element D is at least one type of element selected from Mn, V, Mo, Nb, Ti, and W, and an element E is an element forming an alloy with lithium at a potential more noble than a potential in which ions of the element E are reduced.), wherein the lithium metal composite oxide comprises primary particles and secondary particles formed by aggregating the primary particles. Further, an oxide containing the element E is formed at a surface of at least either of the primary particles and the secondary particles.

Generally, when metal ions are eluted from the positive electrode active material, the metal ions are reduced at a negative electrode to from metal, and an area capable of reacting with lithium ions will be decreased, so negative electrode resistance increases.

On the other hand, in this embodiment, by selecting and adding the element E, which is an element forming an alloy with lithium at a potential more noble than a potential in which ions of the element E are reduced, the element E forms an alloy with lithium at the negative electrode and precipitates, so it can be used as a site capable of reacting with lithium.

In addition, in a case of lithium intercalation material having layered structure such as graphite negative electrode, it cannot be used as reaction field of lithium unless a plane capable of insertion and deinsertion of lithium is directed toward a surface. On the other hands, by precipitating lithium and an alloy at a plane not capable of insertion and deinsertion of lithium, a surface area effective of insertion and deinsertion of lithium in the negative electrode is increased, and reaction field of lithium at the negative electrode increases.

Here, in this embodiment, the element E exists as the oxide containing the element E formed at a surface of at least either of the primary particles and the secondary particles. As the element E exists as the oxide formed at a surface of at least either of the primary particles and the secondary particles, it will be easy to elute to an electrolyte solution when charging and discharging the battery, and ions of the element E eluted at positive electrode side move to negative electrode side via the electrolyte solution, and a sufficient amount of alloy of lithium and the element E will be formed at a surface of a negative electrode active material.

An addition amount of the element E is represented by z in the general formula, and its range is $0.002 \leq z \leq 0.05$. When z is less than 0.002, an amount of the element E eluted to the electrolyte solution will be insufficient, an alloy of lithium and the element E will not be formed sufficiently to an amount to be able to decrease negative electrode resistance. On the other hand, when z is more than 0.05, an amount of the element E eluted to electrolyte solution will be increased, and an alloy of lithium and the element E will be formed excessively, so negative electrode resistance will be increased.

The element E is not limited particularly as long as it is an element to form an alloy with lithium at a potential more noble than a potential in which ions of the element E are reduced, but it is preferable that it is at least one type of element selected from Mg, Al, and Si. Mg, Al, and Si are easy to elute to an electrolyte solution and easy to form an alloy with lithium, so they are having excellent effect in decreasing negative electrode resistance.

Further, it is preferable that the element E is at least two types of elements selected from Mg, Al, and Si. These combinations of elements form an alloy with lithium in the negative electrode more efficiently than selecting one type of element from Mg, Al, and Si, and precipitate to be able to increase reaction field of lithium at the negative electrode. As a result, these combinations of elements are able to further decrease negative electrode resistance.

A part of the element E may be solid-solved in the primary particles and the secondary particles. A solid-solution portion of the element E only functions to improve a characteristic of the positive electrode, so by solid-solving a part of the element E in the primary particles and the secondary particles, not only an effect to decrease negative electrode resistance by an eluted portion, but also an effect to improve a characteristic, for example a heat stability, of the positive electrode active material is achieved. At this time, it is preferable that the oxide containing the element E, which is capable of eluting sufficient amount of the element E in the electrolyte solution is formed.

A range of x representing a content of cobalt is $0.05 \leq x \leq 0.35$, preferably $0.10 \leq x \leq 0.35$, more preferably $0.15 \leq x \leq 0.35$, and further, more preferably $0.20 \leq x \leq 0.35$. When cobalt content is in the above range, it is having a stability with high crystal structure, and it is more excellent in cycle characteristic.

A range of y representing a content of the element D is $0 \leq y \leq 0.35$, preferably $0.05 \leq y \leq 0.35$, more preferably $0.15 \leq y \leq 0.35$, and further, more preferably $0.20 \leq y \leq 0.35$. The element D contributes to improve cycle characteristic, and further, it is an element added for improving battery characteristic. When a content of the element D is in the above range, an effect to improve high battery characteristic can be achieved. For example, when Mn is selected as the element D, high heat stability is achieved by setting it in the above range.

In the positive electrode active material, a value of "a" representing a content of lithium is set to be $1.00 \leq a \leq 1.30$. When lithium content "a" is less than 1.00, a reaction resistance of the positive electrode in the non-aqueous electrolyte secondary battery using the obtained positive electrode active material becomes high, so an output of the battery will be decreased. On the other hand, when lithium content "a" is more than 1.30, a discharge capacity when the positive electrode active material is used as the positive electrode of the battery will be decreased, and also, a reaction resistance of the positive electrode will be increased. From a point of view of decreasing a reaction resistance more, a value of lithium content "a" is preferably $1.00 \leq a \leq 1.20$, more preferably $1.00 \leq a \leq 1.15$.

In addition, in the non-aqueous electrolyte secondary battery using the positive electrode active material relating to this embodiment, when the positive electrode active material is used as the positive electrode of the non-aqueous electrolyte secondary battery, it is preferable that the element E contained in the negative electrode after charge and discharge of the battery is 50 mass ppm or more and 600 mass ppm or less with respect to the negative electrode. By this feature, an alloy containing an appropriate amount of lithium and the element E is formed, and an effect to decrease negative electrode resistance is achieved. Here, the charge and discharge mean a state, for example when 500 cycles have been performed, when charge and discharge is defined as one cycle.

The positive electrode active material as the above is represented by a general formula: $Li_aNi_{1-x-y-z}Co_xD_yE_zO_2$, wherein the addition amount of the element E is $0.002 \leq z \leq 0.05$, and the element E exists as the oxide containing the element E formed at a surface of at least either of the primary particles and the secondary particles.

Therefore, by using the positive electrode active material as the positive electrode material, it will be easy to elute to the electrolyte solution when charging and discharging the battery, and ions of the element E eluted at the positive electrode side move to the negative electrode side via the electrolyte solution, and a sufficient amount of alloy of lithium and the element E will be formed at a surface of the negative electrode active material. As a result, a non-aqueous electrolyte secondary battery having excellent characteristics is obtained by decreasing negative electrode resistance without changing a composition ratio of a positive electrode and a negative electrode.

[2. Process for Manufacturing Positive Electrode Active Material]

Figure 1:
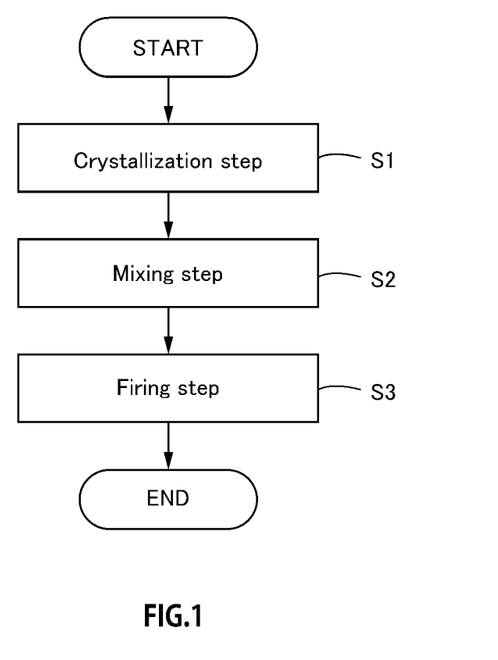
FIG. 1 is a flow chart illustrating an outline of a process for manufacturing a positive electrode active material for a non-aqueous electrolyte secondary battery relating to one embodiment of the present invention.

Next, explaining about a process for manufacturing positive electrode active material using the drawings. FIG. 1 is a flow chart illustrating an outline of a process for manufacturing a positive electrode active material for a non-aqueous electrolyte secondary battery relating to one embodiment of the present invention. As illustrated in FIG. 1, a process for manufacturing a positive electrode active material for a non-aqueous electrolyte secondary battery relating to one embodiment of the present invention comprises: a crystallization step S1 for crystallizing transition metal composite hydroxide particles by supplying and mixing an aqueous solution at least containing nickel and cobalt, an aqueous solution containing ammonium ion donor, and an alkaline solution; a mixing step S2 for mixing a transition metal composite hydroxide obtained by the crystallization step S1, a compound containing an element E, and a lithium compound; a firing step S3 for firing a lithium mixture obtained by the mixing step S2 at a temperature of 700° C. to 1000° C. and forming a lithium metal composite oxide. Hereinafter, explaining in detail about each step in the process for manufacturing a positive electrode active material for a non-aqueous electrolyte secondary battery relating to this embodiment.

(2-1. Crystallization Step)

A crystallization step S1 is a step for crystallizing transition metal composite hydroxide particles by supplying and mixing an aqueous solution at least containing ions of nickel and cobalt (raw material aqueous solution), an aqueous solution containing ammonium ion donor, and an alkaline solution, in a reaction tank. Here, the transition metal composite hydroxide particles are represented by a general formula: $Ni_{1-x-y}Co_xD_y(OH)_{2+\alpha}$ (wherein, in the formula, $0.05 \le x \le 0.35$, $0 \le y \le 0.35$, an element D is at least one type of element selected from Mn, V, Mo, Nb, Ti, and W, and $\alpha$ is an index determined by a value number of a metal element contained in the hydroxide, and also, $\alpha$ is $0 \le \alpha \le 0.4$.).

As the crystallization step S1, publicly known crystallization technology (for example, JP Publication No. 2011-116580) can be used, if it is possible to obtain the transition metal composite hydroxide particles represented by the above general formula. For example, the transition metal composite hydroxide particles can be obtained by a nucleation step for performing nucleation by adjusting pH value on the basis of a liquid temperature of 25° C. of a reaction aqueous solution to a range of 12.0 to 14.0, and by a particle growth step for growing nuclei by controlling pH value on the basis of a liquid temperature of 25° C. of a reaction aqueous solution containing nuclei obtained in the nucleation step to be lower than pH value of the nucleation step, and also, to be 10.5 to 12.0. In addition, a continuation process for recovering the transition metal composite hydroxide particles by overflowing a reaction solution, which is prepared by continuously supplying and mixing the raw material aqueous solution and the aqueous solution containing ammonium ion donor in the reaction tank, while controlling pH value to be constant by supplying the alkaline solution, can be used.

The element E may be contained in the transition metal composite hydroxide particles by adding the element E to the raw material aqueous solution in the crystallization step S1. In this case, an addition amount of the element E is within a content of the element E in finally obtained lithium metal composite oxide, and also, it is in an amount decreasing a mixing amount of the element E in following mixing step S2. By adding the element E in the crystallization step S1, an amount of the element E solid-solved in the lithium metal composite oxide can be controlled easily for improving battery characteristic.

[2-2. Mixing Step]

A mixing step S2 is a step for obtaining a lithium mixture by mixing a lithium compound and a compound containing the element E to a transition metal composite hydroxide obtained by the crystallization step S1. By this mixing step S2, an oxide containing the element E is formed at a surface of at least either of the primary particles and the secondary particles of a lithium metal composite oxide obtained by following firing step S3.

In the mixing step S2, the transition metal composite hydroxide and the lithium compound are mixed such that a ratio (Li/Me) of number of atoms of lithium (Li) to a sum of number of atoms of metal elements other than lithium in the lithium mixture, concretely nickel, cobalt, and additive elements (element D, E), will be 1.00 to 1.30, preferably 1.00 to 1.20, more preferably 1.00 to 1.15. In other words, Li/Me does not change before and after the following firing step S3, so the transition metal composite hydroxide and the lithium compound are mixed such that Li/Me in the mixing step S2 will be Li/Me of the aiming positive electrode active material.

The lithium compound used in the mixing step S2 is not limited particularly, but it is preferable to use lithium hydroxide, lithium nitrate, lithium carbonate, or mixture thereof, from a point of view of easiness of availability. Especially, considering easiness of handling and stability of quality, it is preferable to use lithium hydroxide or lithium carbonate.

In the mixing step S2, the compound containing the element E is mixed together with the lithium compound. In the above publicly known crystallization technology, the additive element is added in the crystallization step comprising the nucleation step and the particle growth step. However, when the element E is added only in the crystallization step, an amount of an oxide containing the element E existing on a surface of the primary particles and the secondary particles of the lithium metal composite oxide will be low. Therefore, when the positive electrode active material produced by the above publicly known crystallization technology is used in a battery as a positive electrode, the element E will not be eluted sufficiently, and an amount of alloy of lithium and the element E formed at the negative electrode side will be low, so an effect to decrease negative electrode resistance will be low. Therefore, different from the above publicly known crystallization technology, in the mixing step S2 of this embodiment, the compound containing the element E is mixed, so that the oxide containing the element E can be formed on a surface of at least either of the primary particles and the secondary particles. In addition, as mentioned above, the element E may be added not only in the mixing step S2, but also in the raw material aqueous solution in the crystallization step S1.

In addition, an amount of element E in the compound containing the element E does not change before and after the firing step S3. Therefore, the compound containing the element E is mixed such that it will be an atomic ratio of the above general formula: $Li_aNi_{1-x-y-z}Co_xD_yE_zO_2$ (wherein, in the formula, $0.05 \le x \le 0.35$, $0 \le y \le 0.35$, $0.002 \le z \le 0.05$, $1.00 \le a \le 1.30$, an element D is at least one type of element selected from Mn, V, Mo, Nb, Ti, and W, and an element E is an element forming an alloy with lithium at a potential more noble than a potential in which ions of the element E are reduced), representing a composition of the positive electrode active material. Here, when the element E is added in the crystallization step S1, an amount of the element E added in the crystallization step S1 should be decreased, and when the compound containing the element E contains lithium, the lithium compound should be decreased for an amount of lithium contained in the compound containing the element E.

The compound containing the element E is not limited particularly, but from a point of view of preventing a mixing of impurities, it is preferable to use hydroxide, oxide, lithium carbonate, or mixture thereof.

It is preferable that the transition metal composite hydroxide particles or heat treatment particles and the lithium compound are mixed sufficiently to the extent that fine powder will not be generated. When the mixing is insufficient, a variation in Li/Me occurs between respective particles, and there is a possibility that sufficient battery characteristic cannot be obtained. In addition, standard mixer can be used for mixing, and for example, shaker mixer, Loedige mixer, Julia mixer, V blender or the like can be used.

Before the mixing step S2, a heat treatment step for heat treating the transition metal composite hydroxide obtained by the crystallization step S1 may be added. The heat treatment step is a step for heat treating the transition metal composite hydroxide by heating to a temperature of 105° C. to 750° C., and a moisture contained in the transition metal composite hydroxide is removed. By performing this heat treatment step, a moisture remaining in the transition metal composite hydroxide until the firing step S3 can be decreased until a certain amount. Therefore, a variation of a proportion of a number of atoms of lithium and a number of atoms of metal in the obtained positive electrode active material can be prevented.

In addition, it is fine as long as a moisture is removed to the extent that a variation will not be occurred in a proportion of a number of atoms of lithium and a number of atoms of metal in the positive electrode active material, so it is not necessary to convert all of the transition metal composite hydroxide to the transition metal composite oxide. However, it is preferable to convert all of the transition metal composite hydroxide to the transition metal composite oxide by setting a heating temperature to 500° C. or more, in order to further decrease the variation.

In the heat treatment step, when the heating temperature is 105° C. or less, excess moisture in the transition metal composite hydroxide will not be removed, and the variation may not be inhibited. On the other hand, when the heating temperature is 750° C. or more, the transition metal composite oxide with uniform particle size may not be obtained as the particles sinter by the heat treatment. The variation can be inhibited by previously calculating a metal component contained in the transition metal composite hydroxide according to the heat treatment condition by analysis, and by determining a ratio between the lithium compound and the metal component.

An atmosphere to perform the heat treatment is not limited particularly, as long as it is a non-reducing atmosphere, but it is preferable to perform the heat treatment in an airflow as it can be performed easily.

In addition, a heat treatment time is not limited particularly, but if it is less than 1 hour, excess moisture in the transition metal composite hydroxide may not be removed sufficiently, so the heat treatment time is preferably at least 1 hour or more, and more preferably 5 to 15 hours.

And, an equipment used for heat treatment is not limited particularly, and it is fine as long as it is capable of heating the transition metal composite hydroxide in non-reducing atmosphere, preferably in air atmosphere, and an electric furnace without gas generation can be used preferably.

(2-3. Calcination Step)

In a calcining step, when lithium hydroxide or lithium carbonate is used as the lithium compound, after the mixing step S2 and before the firing step S3, the lithium compound may be calcined at a temperature lower than a firing temperature in the following firing step S3, that is, at a temperature of 350° C. to 800° C., preferably 450° C. to 780° C. Thereby, lithium can be diffused sufficiently in the transition metal composite hydroxide or in the heat-treated transition metal composite hydroxide, so more uniform lithium metal composite oxide can be obtained. In addition, a time for maintaining the temperature is preferably 1 to 10 hours, more preferably 3 to 6 hours. In addition, an atmosphere in the calcining step is preferably oxidizing atmosphere as well as in the following firing step S3, and an atmosphere having an oxygen concentration of 18% to 100% by volume is more preferable.

(2-4. Firing Step)

A firing step S3 is a step for obtaining a lithium metal composite oxide by diffusing lithium in the transition metal composite hydroxide or in the heat-treated transition metal composite hydroxide, by firing the lithium mixture obtained in the mixing step S2 at a temperature of 700° C. to 1000° C. In addition, the added compound containing the element E becomes an oxide, and this oxide exists at a surface of at least either of the primary particles and the secondary particles of the lithium metal composite oxide. In addition, a furnace used in the firing step S3 is not limited particularly, and any furnace can be used as long as it can heat the lithium mixture in an atmospheric air or in an oxygen flow. However, from a point of view of maintaining an atmosphere in the furnace to be uniform, an electric furnace without gas generation is preferable, and both batch type and continuous type electric furnace can be used preferably. About this point, same applies to a furnace used in the heat treatment step and the calcining step.

a) Firing Temperature

A firing temperature of the lithium mixture is in a range of 700° C. to 1000° C., preferably in a range of 800° C. to 950° C. When the firing temperature is less than 700° C., lithium does not diffuse sufficiently in the transition metal composite hydroxide or in the heat-treated transition metal composite hydroxide, and excess lithium remains or unreacted transition metal composite hydroxide or unreacted heat-treated transition metal composite hydroxide remains, and crystallinity of the obtained lithium metal composite oxide will be insufficient. On the other hand, when the firing temperature is more than 1000° C., sintering between lithium metal composite oxides occurs intensely, causing abnormal particle growth, and a proportion of unstable coarse particles increases, as a result, particle filling property decreases and battery characteristic decreases. Further, a mixing occurs at Li site and transition metal site, and battery characteristic decreases. In addition, in order to obtain the positive electrode active material in which "1−x−y−z" representing Ni content in the above general formula is more than 0.8, it is preferable that the firing temperature is 700° C. to 850° C. In addition, a temperature rising rate in the firing step S3 is preferably 2° C./min to 10° C./min, more preferably 5° C./min to 10° C./min. Further, in the firing step S3, it is preferable to maintain a temperature at a temperature near a melting point of the lithium compound for preferably 1 to 5 hours, more preferably 2 to 5 hours. Thereby, a reaction with the lithium compound will be more uniform.

b) Firing Time

In a firing time, it is preferable that a time for maintaining the above firing temperature is at least 2 hours, and more preferably 4 to 24 hours. When the time for maintaining the firing temperature is less than 2 hours, lithium does not diffuse sufficiently in the particles, and excess lithium remains or unreacted transition metal composite hydroxide or unreacted heat-treated transition metal composite hydroxide remains, and crystallinity of the obtained lithium metal composite oxide may be insufficient. In addition, there is a risk that the oxide containing the element E will not be formed sufficiently at a surface of at least either of the primary particles and the secondary particles of the lithium metal composite oxide. In addition, after the end of the time for maintaining the firing temperature, a cooling rate from the firing temperature to at least 200° C. is preferably 2°

C./min to 10° C./min, more preferably 3° C./min to 7° C./min. By controlling the cooling rate to such range, an equipment such as saggar can be prevented from being damaged by rapid cooling, while ensuring productivity.

c) Firing Atmosphere

An atmosphere at the time of firing, is preferably an oxidizing atmosphere, more preferably an atmosphere with oxygen concentration of 18% to 100% by volume, especially preferably a mixed atmosphere of an inert gas and an oxygen with the above oxygen concentration. In other words, it is preferable that the firing is performed in an air atmosphere or oxygen atmosphere. When oxygen concentration is less than 18% by volume, there is a risk that crystallinity of the lithium metal composite oxide will be insufficient.

(2-5. Crushing Step)

There is a case that aggregation or minor sintering is occurred to the lithium metal composite oxide obtained by the firing step S3. In this case, it is preferable to crush aggregate or sintered body of the lithium metal composite oxide. Thereby, particle size distribution and average particle size of the obtain positive electrode active material is adjusted to a preferable range. In addition, crushing means an operation to disaggregate an aggregate, which is formed by a plurality of secondary particles generated by sintering necking or the like between the secondary particles when firing, by charging mechanical energy to separate the secondary particles without breaking the secondary particles.

As a process for crushing, publicly known means can be used, and for example, a pin mill, a hammer mill, and else can be used. In addition, at this time, it is preferable to adjust crushing force to an appropriate range for not breaking the secondary particles.

Such process for manufacturing the positive electrode active material can provide the positive electrode active material for non-aqueous electrolyte secondary battery having excellent characteristics as described above. Further, this manufacturing process is easy and suitable for a production on an industrial scale, so its industrial value is significantly high.

[3. Non-Aqueous Electrolyte Secondary Battery]

Next, explaining about a non-aqueous electrolyte secondary battery using a positive electrode active material manufactured by this embodiment. The non-aqueous electrolyte secondary battery (Hereinafter, referred to as "secondary battery".) comprises similar components as a standard non-aqueous electrolyte secondary battery such as a positive electrode, a negative electrode, a separator, and a non-aqueous electrolyte solution.

(3-1. Components)

a) Positive Electrode

A positive electrode of a non-aqueous electrolyte secondary battery is produced, for example as below, by using the positive electrode active material.

At first, the positive electrode active material relating to this embodiment is mixed with a conductive material and a binding agent, and further, a solvent such as a viscosity modifier, or an activated carbon is added according to need, and these materials are kneaded to produce a positive electrode mixture paste. A mixing ratio of each raw material in the positive electrode mixture paste will be an important factor for determining a performance of the non-aqueous electrolyte secondary battery. For example, when a solid content in the positive electrode mixture paste excluding a solvent is 100 parts by mass, it is possible to adjust a content of the positive electrode active material to 60 to 95 parts by mass, and to adjust a content of the conductive material to 1 to 20 parts by mass, and to adjust a content of the binding agent to 1 to 20 parts by mass, as well as the positive electrode of the standard non-aqueous electrolyte secondary battery.

The obtained positive electrode mixture paste is applied, for example on a surface of a current collector made of aluminum foil, and dried to scatter the solvent. In addition, it may be pressed by roll press or the like, in order to increase electrode density according to need. As such, a sheet-like positive electrode can be produced. The sheet-like positive electrode can be used for production of battery by cutting or the like into appropriate size according to aimed battery. In addition, a process for producing the positive electrode is not limited to the above exemplified process, and other process may be used.

As the conductive material, for example graphite (natural graphite, artificial graphite, expanded graphite, or the like), or carbon black material such as acetylene black or Ketjen black, can be used.

The binding agent serves a function to bind active material particles, and for example, polyvinylidene fluoride (PVDF), polytetrafluoroethylene (PTFE), fluororubber, ethylene propylene diene rubber, styrene butadiene, cellulose resin, polyacrylic acid or the like, can be used as the binding agent.

Besides this, according to need, a solvent for dissolving the binding agent can be added to the positive electrode mixture to disperse the positive electrode active material, the conductive material, and activated carbon. As the solvent, an organic solvent such as N-methyl-2-pyrrolidone can be used concretely. In addition, activated carbon can be added to the positive electrode mixture, in order to increase electric double layer capacity.

b) Negative Electrode

As a negative electrode, metal lithium, lithium alloy, or the like can be used. In addition, a negative electrode mixture in the form of paste is prepared by mixing the binding agent to a negative electrode active material capable of insertion and deinsertion of lithium ion, and by adding an appropriate solvent, and the negative electrode mixture is applied on a surface of a metal foil current collector such as copper, and dried, and compressed to increase electrode density according to need to form the negative electrode to be used.

As the negative electrode active material, for example, it is possible to use: a material containing lithium such as metal lithium or lithium alloy; natural graphite or artificial graphite capable of insertion and deinsertion of lithium ion; an organic compound fired body such as phenol resin; and a powder body of carbon material such as coke. In this case, as the binding agent for the negative electrode, it is possible to use fluorine containing resin such as PVDF, as well as the positive electrode, and as a solvent for dispersing these active material and binding agent, it is possible to use an organic solvent such as N-methyl-2-pyrrolidone.

c) Separator

A separator is arranged to be interposed between the positive electrode and the negative electrode, and it is having a function to retain electrolyte by separating the positive electrode and the negative electrode. As such separator, for example, it is possible to use a thin film of polyethylene, polypropylene or the like having numerous fine holes, but it is not limited particularly as long as it is having the above function.

d) Non-Aqueous Electrolyte Solution

A non-aqueous electrolyte solution is an electrolyte solution dissolving lithium salt in an organic solvent as a supporting salt. As the organic solvent, it is possible to use one kind solely or by mixing two kinds or more selected from: a cyclic carbonate such as ethylene carbonate, propylene carbonate, butylene carbonate, and trifluoro propylene carbonate; a chain carbonate such as diethyl carbonate, dimethyl carbonate, ethyl methyl carbonate, and dipropyl carbonate; an ether compound such as tetrahydrofuran, 2-methyl tetrahydrofuran, and dimethoxyethane; a sulfur compound such as ethyl methyl sulfone and butane sultone; and a phosphor compound such as triethyl phosphate and trioctyl phosphate.

As the supporting salt, it is possible to use $LiPF_6$, $LiBF_4$, $LiClO_4$, $LiAsF_6$, $LiN(CF_3SO_2)_2$ and combined salt thereof. Further, the non-aqueous electrolyte solution may contain a radical scavenger, a surfactant, a flame retardant or the like. In addition, carbonate, nitrate, hydrochloride and sulfate of Mg, Al and Si having high solubility may be previously dissolved in the non-aqueous electrolyte solution for efficiently forming an alloy with lithium of the negative electrode.

(3-2. Non-Aqueous Electrolyte Secondary Battery)

A non-aqueous electrolyte secondary battery relating to this embodiment can be formed in various shapes such as cylindrical or layered shape. Even when the non-aqueous electrolyte secondary battery is adopting any shape, the positive electrode and the negative electrode are laminated via the separator to form an electrode body, and the obtained electrode body is impregnated with the non-aqueous electrolyte solution, and a positive electrode current collector and a positive electrode terminal communicating to outside, and also, a negative electrode current collector and a negative electrode terminal communicating to outside are connected using a current collecting lead or the like, and a battery case is sealed to complete the non-aqueous electrolyte secondary battery.

(3-3. Characteristics of Non-Aqueous Electrolyte Secondary Battery)

The non-aqueous electrolyte secondary battery relating to this embodiment is using the positive electrode active material relating to this embodiment as a positive electrode material, so it is excellent in battery capacity, output characteristic, and cycle characteristic, by decreasing negative electrode resistance. Also, it can be said that this non-aqueous electrolyte secondary battery is excellent in heat stability and safety, even compared with a secondary battery using a positive electrode active material composed of conventional lithium nickel composite oxide particles.

Figure 2:
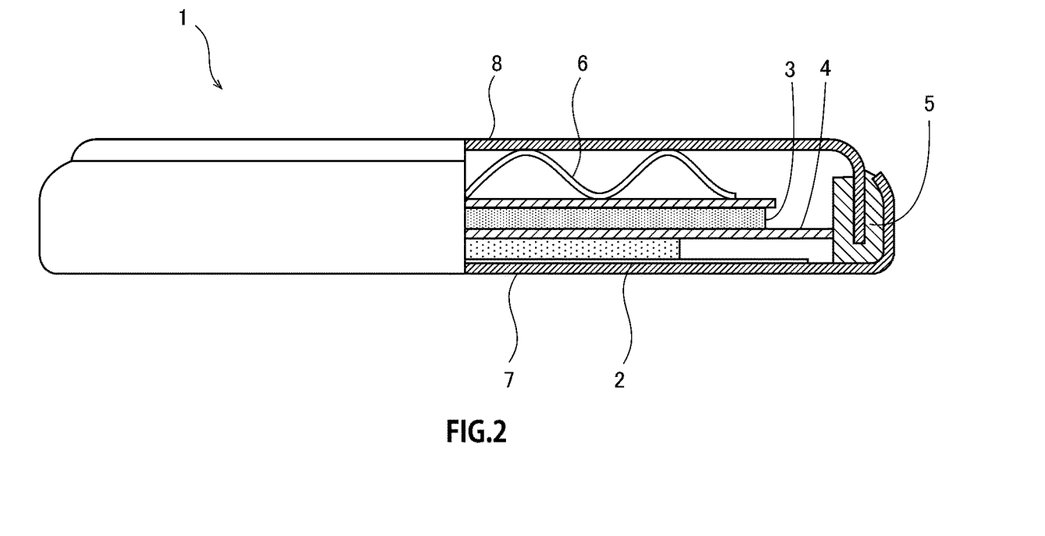
FIG. 2 is a schematic sectional view of a coin battery used for evaluation of battery characteristic.

FIG. 2 is a schematic sectional view of a coin battery used for evaluation of battery characteristic. When composing a 2032 type coin battery illustrated in FIG. 2, it is possible to simultaneously achieve initial discharge capacity of 150 mAh/g or more, preferably 158 mAh/g or more, positive electrode resistance of 1.10Ω or less, preferably 1.05Ω or less, and capacity maintenance rate at 500 cycles of 75% or more, preferably 80% or more.

(3-4. Intended Use)

As mentioned above, the non-aqueous electrolyte secondary battery relating to this embodiment is excellent in battery capacity, output characteristic, and cycle characteristic, and it can be used suitably for a power source of compact portable electronic devices (notebook computer, mobile phone, or the like), which requires these characteristics at a high level. In addition, the non-aqueous electrolyte secondary battery relating to this embodiment is also excellent in safety, and not only that miniaturization and high output can be achieved, but also it is possible to simplify an expensive protection circuit, so it can be used suitably as a power source of a transport equipment in which loading space is restricted.

EXAMPLES

Hereinafter, a positive electrode active material for a non-aqueous electrolyte secondary battery relating to the embodiment of the present invention will be described in more detail with reference to examples, but the present invention is not limited to these examples.

About a secondary battery having a positive electrode using the positive electrode active material obtained by this embodiment, the performance (negative electrode resistance, amount of eluted metal after cycle) of the secondary battery was measured respectively.

(Production of Battery)

52.5 mg of the obtained positive electrode active material, 15 mg of acetylene black, and 7.5 mg of polytetrafluoroethylene (PTFE) resin were mixed, and press-formed to a diameter of 11 mm and a thickness of 100 μm at a pressure of 100 MPa, and a positive electrode (electrode for evaluation) 2 as illustrated in FIG. 2 was produced. After drying the produced positive electrode 2 for 12 hours at 120□ in a vacuum dryer, a 2032 type coin battery was produced using this positive electrode 2, in a glove box of Ar atmosphere in which dew point is controlled to −80° C. As a negative electrode 3, lithium (Li) metal with a diameter of 17 mm and a thickness of 1 mm was used, and as an electrolyte solution, an equally mixed solution (made by Fuji Chemicals Industrial Co., Ltd.) of ethylene carbonate (EC) and diethyl carbonate (DEC) with 1M $LiClO_4$ as supporting electrolyte was used. As a separator 4, a polyethylene porous film with a film thickness of 25 μm was used. In addition, the coin battery is having a gasket 5 and a wave washer 6, and it was assembled as the coin type battery with a positive electrode can 7 and a negative electrode can 8.

(Evaluation of Battery)

Initial discharge capacity is a capacity when the coin battery 1 is produced and left for about 24 hours, and after open circuit voltage (OCV) became stable, charged until cutoff voltage of 4.3 V by setting current density with respect to the positive electrode to 0.1 mA/cm$^2$, and after stopped for 1 hour, discharged until cutoff voltage of 3.0 V.

Figure 3:
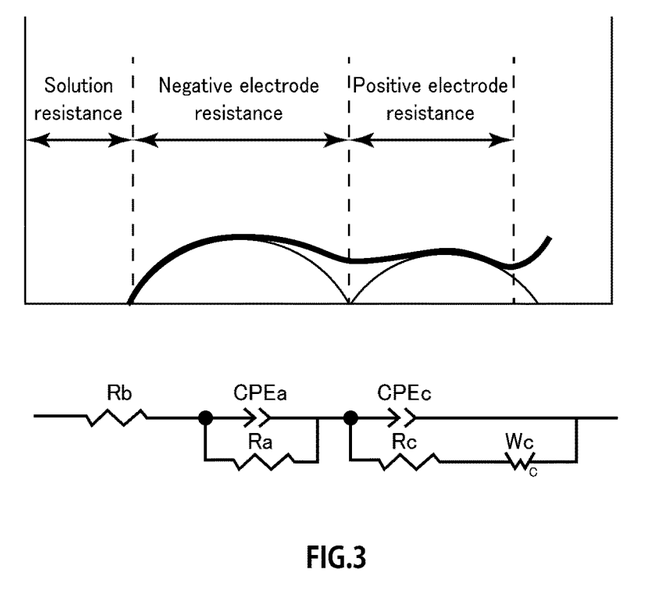
FIG. 3 is a schematic explanation view of an example of measurement of impedance evaluation and an equivalent circuit used for analysis.

In addition, when positive electrode resistance and negative electrode resistance were measured by alternate current impedance method using a frequency response analyzer and a potentio-galvanostat (made by Solartron Analytcal, 1255B) by charging the coin battery 1 at charging potential 4.1 V, Nyquist plot illustrated in FIG. 3 was obtained. This Nyquist plot is illustrated as a sum of characteristic curves indicating solution resistance, negative electrode resistance and its capacity, and positive electrode resistance and its capacity, so based on this Nyquist plot, a value of negative electrode resistance was calculated by performing a fitting calculation using an equivalent circuit.

In addition, an amount of eluted metal from the positive electrode to the negative electrode was evaluated by performing a composition analysis by inductively coupled plasma (ICP) method using ICP-OES device (Product Name: Agilent 730-ES, made by Agilent Technologies, Inc.), regarding the negative electrode before and after charge and discharge cycle test of 500 times at 60□.

In addition, in the following examples 1 to 8 and comparative examples 1 to 3, the composite hydroxide, the positive electrode active material and the secondary battery were produced by using special grade reagents manufactured by Wako Pure Chemical Industries, Ltd to each sample.

Example 1

In example 1, a transition metal composite hydroxide powder represented by $Ni_{0.35}Co_{0.35}Mn_{0.30}(OH)_{2+\alpha}$ (wherein $0 \leq \alpha \leq 0.4$) was obtained by a publicly known technology including a nucleation step for performing nucleation by adjusting pH value on the basis of a liquid temperature of 25° C. of a reaction aqueous solution to a range of 12.0 to 14.0, and a particle growth step for growing nuclei by controlling pH value on the basis of a liquid temperature of 25° C. of a reaction aqueous solution containing nuclei obtained in the nucleation step to be lower than pH value of the nucleation step, and also, to be in a range of 10.5 to 12.0 (Crystallization step S1).

A lithium mixture was obtained by sufficiently mixing the transition metal composite hydroxide powder, a compound containing an element E, and lithium carbonate using a shaker mixer device (TURBULA Type T2C made by Willy A. Bachofen AG) (Mixing step S2). Here, magnesium oxide was selected as the compound containing the element E, and an addition amount of magnesium with respect to a sum of metal elements (Ni, Mn, Co) contained in the transition metal composite hydroxide powder and magnesium in the added magnesium oxide was 0.02 atomic percent. In addition, a molar ratio of lithium with respect to a sum of the metal elements contained in the transition metal composite hydroxide powder and magnesium in the added magnesium oxide was 1.14.

This lithium mixture was inserted in a firing container made of magnesia, temperature was rose until 900° C. in an atmosphere with air atmosphere gas flow rate of 10 L/minute using a closed type electric furnace, temperature of 900° C. was maintained for ten hours, furnace cooling was performed until room temperature, and the positive electrode active material comprised of a lithium metal composite oxide was obtained (Firing step S3).

A measurement of particle size distribution of the obtained positive electrode active material was performed by laser diffraction scattering type particle size distribution measuring device (Product name: Microtrac MT3300EXII made by MicrotracBEL Corporation). As a result, average particle size d50 was 6.7 μm. In addition, d50 means a particle size in which a cumulative volume accumulating a number of particles in each particle size from small diameter becomes 50% of a total volume.

In addition, by observation by a scanning electron microscope, it was confirmed that secondary particles are formed by aggregated primary particles, and that Mg exists at a surface of at least either of the primary particles and the secondary particles. As Mg was fired in an oxidizing atmosphere, it is considered that Mg exists in a form of oxide at a surface of at least either of the primary particles and the secondary particles.

(Evaluation of Battery)

Battery characteristic of a coin battery having a positive electrode manufactured by using the obtained positive electrode active material was evaluated. In addition, an evaluation value of an amount of eluted metal and negative electrode resistance is illustrated in a table 1.

Examples 2 to 8, Comparative Examples 1 to 3

In examples 2 to 8 and comparative examples 1 to 3, positive electrode active materials were obtained and evaluated as similar as the example 1, except that types and addition amount of the added compound containing the element E have been changed as indicated in the table 1. In addition, an evaluation value of an amount of eluted metal and negative electrode resistance is illustrated in the table 1.

In addition, in the positive electrode active material obtained by the examples 2 to 8 and comparative examples 2 to 3, it was confirmed that the element E (Mg, Al, Si) exists at a surface of at least either of the primary particles and the secondary particles, by observation by a scanning electron microscope. As the element E was fired in an oxidizing atmosphere respectively, it is considered that the element E exists in a form of oxide at a surface of at least either of the primary particles and the secondary particles.

TABLE 1

| | General formula | Additive element | Negative electrode resistance [Ω] | Amount of elluted metal [mass ppm] |
|---|---|---|---|---|
| Example 1 | $Li_{1.14}Ni_{0.343}Mn_{0.294}Co_{0.343}Mg_{0.02}O_2$ | Mg 2at % | 0.612 | 120 |
| Example 2 | $Li_{1.14}Ni_{0.343}Mn_{0.294}Co_{0.343}Al_{0.02}O_2$ | Al 2at % | 0.590 | 135 |
| Example 3 | $Li_{1.14}Ni_{0.343}Mn_{0.294}Co_{0.343}Si_{0.02}O_2$ | Si 2at % | 0.632 | 140 |
| Example 4 | $Li_{1.14}Ni_{0.333}Mn_{0.284}Co_{0.333}Mg_{0.05}O_2$ | Mg 5at % | 0.531 | 421 |
| Example 5 | $Li_{1.14}Ni_{0.349}Mn_{0.30}Co_{0.349}Mg_{0.002}O_2$ | Mg 0.2at % | 0.687 | 103 |
| Example 6 | $Li_{1.14}Ni_{0.333}Mn_{0.284}Co_{0.333}Al_{0.05}O_2$ | Al 5at % | 0.521 | 398 |
| Example 7 | $Li_{1.14}Ni_{0.349}Mn_{0.30}Co_{0.349}Al_{0.002}O_2$ | Al 0.2at % | 0.669 | 167 |
| Example 8 | $Li_{1.14}Ni_{0.343}Mn_{0.294}Co_{0.343}Mg_{0.01}Al_{0.01}O_2$ | Mg 1at %, Al 1at % | 0.542 | 211 |
| Comparative Example 1 | $Li_{1.14}Ni_{0.35}Mn_{0.30}Co_{0.35}O_2$ | — | 0.912 | 25 |
| Comparative Example 2 | $Li_{1.14}Ni_{0.329}Mn_{0.282}Co_{0.329}Mg_{0.06}O_2$ | Mg 6at % | 0.894 | 684 |
| Comparative Example 3 | $Li_{1.14}Ni_{0.35}Mn_{0.299}Co_{0.35}Mg_{0.001}O_2$ | Mg 1at % | 0.935 | 49 |

Consideration by Examples

In the examples 1 to 8, negative electrode resistance was decreased to 0.80Ω or less, by E of the above general formula: $Li_aNi_{1-x-y-z}Co_xD_yE_zO_2$ being in a range of $0.002 \leq z \leq 0.05$ atomic percent. It is considered that the reason for this is because an amount of oxide containing the element E existing at a surface of at least either of the primary particles and the secondary particles was appropriate. Especially, in the example 8, compared to the examples 1 to 3 having same existence ratio, negative electrode resistance was decreased more certainly, by combining two types of elements Mg and Al as the element E of the above general formula.

On the other hand, in the comparative examples 1 to 3, as the element E of the above general formula not being in a range of 0.002≤z≤0.05 atomic percent, negative electrode resistance was not decreased compared to the examples 1 to 8. It is considered that the reason for this is because an amount of oxide containing the element E existing at a surface of at least either of the primary particles and the secondary particles was not appropriate.

Glossary of Drawing References

1 Coin battery
2 Positive electrode
3 Negative electrode
4 Separator
5 Gasket
6 Wave washer
7 Positive electrode can
8 Negative electrode can
S1 Crystallization step
S2 Mixing step
S3 Firing step

The invention claimed is:

1. A positive electrode active material for a non-aqueous electrolyte secondary battery comprising a lithium metal composite oxide,
wherein the lithium metal composite oxide is represented by a general formula: $Li_aNi_{1-x-y-z}Co_xD_yE_zO_2$ wherein, in the formula, $0.05 \leq x \leq 0.35$, $0 \leq y \leq 0.35$, $0.002 \leq z \leq 0.05$, $1.00 \leq a \leq 1.30$, an element D is at least one type of element selected from Mn, V, Mo, Nb, Ti, and W, and an element E is an element forming an alloy with lithium at a potential more noble than a potential in which ions of the element E are reduced, the element E being Si, or Si in combination with at least one of Mg and Al, wherein the lithium metal composite oxide comprises primary particles and secondary particles formed by aggregating the primary particles,
wherein an oxide containing the element E exists at a surface of at least either of the primary particles and the secondary particles.

2. The positive electrode active material for the non-aqueous electrolyte secondary battery according to claim 1, wherein at least a part of the element E of the lithium metal composite oxide is solid-solved in the primary particles or the secondary particles.

3. A non-aqueous electrolyte secondary battery comprising:
a positive electrode;
a negative electrode;
a separator; and
a non-aqueous electrolyte,
wherein the positive electrode includes the positive electrode active material for the non-aqueous electrolyte secondary battery according to claim 1 as a constituent material.

4. The non-aqueous electrolyte secondary battery according to claim 3, wherein an alloy of the element E and lithium exists at a surface of the negative electrode after charging and discharging.

5. The non-aqueous electrolyte secondary battery according to claim 4, wherein the element E contained in the negative electrode after charging and discharging is 50 mass ppm or more and 600 mass ppm or less with respect to the negative electrode.

6. A process for manufacturing a positive electrode active material for a non-aqueous electrolyte secondary battery comprising a lithium metal composite oxide, wherein the lithium metal composite oxide is represented by a general formula: $Li_aNi_{1-x-y-z}Co_xD_yE_zO_2$ wherein, in the formula, $0.05 \leq x \leq 0.35$, $0 \leq y \leq 0.35$, $0.002 \leq z \leq 0.05$, $1.00 \leq a \leq 1.30$, an element D is at least one type of element selected from Mn, V, Mo, Nb, Ti, and W, and an element E is an element forming an alloy with lithium at a potential more noble than a potential in which ions of the element E are reduced, the element E being Si, or Si in combination with at least one of Mg and Al, wherein the lithium metal composite oxide comprises primary particles and secondary particles formed by aggregating the primary particles,
wherein the process comprises:
a crystallization step for crystallizing transition metal composite hydroxide particles by supplying and mixing an aqueous solution at least containing nickel and cobalt, an aqueous solution containing ammonium ion donor, and an alkaline solution, in a reaction tank;
a mixing step for mixing a transition metal composite hydroxide obtained by the crystallization step, a compound containing the element E, and a lithium compound; and
a firing step for firing a lithium mixture obtained by the mixing step at a temperature of 700° C. to 1000° C. and forming the lithium metal composite oxide,
wherein an oxide containing the element E is formed at a surface of at least either of the primary particles and the secondary particles by the mixing step.

* * * * *